(12) United States Patent
Chang

(10) Patent No.: US 8,488,676 B2
(45) Date of Patent: Jul. 16, 2013

(54) MOTION ESTIMATION METHOD

(75) Inventor: Fang-Chen Chang, Sinshih Township (TW)

(73) Assignee: Himax Technologies Limited, Tainan County (TW)

( * ) Notice: Subject to any disclaimer, the term of this patent is extended or adjusted under 35 U.S.C. 154(b) by 1738 days.

(21) Appl. No.: 11/798,429

(22) Filed: May 14, 2007

(65) Prior Publication Data

US 2008/0285653 A1    Nov. 20, 2008

(51) Int. Cl.
*H04N 7/12* (2006.01)
(52) U.S. Cl.
USPC .................................................. 375/240.16
(58) Field of Classification Search
USPC ............. 375/240.16, 240.17, 240.24, 240.27, 375/240.29, E07.123
See application file for complete search history.

(56) References Cited

U.S. PATENT DOCUMENTS

| | | | |
|---|---|---|---|
| 5,703,966 A * | 12/1997 | Astle | 382/236 |
| 5,717,615 A * | 2/1998 | Pirson et al. | 708/200 |
| 6,567,469 B1 * | 5/2003 | Rackett | 375/240.16 |
| 6,823,015 B2 * | 11/2004 | Hall et al. | 375/240.24 |
| 7,861,270 B2 * | 12/2010 | St. Laurent et al. | 725/63 |
| 7,876,968 B2 * | 1/2011 | Chang | 382/245 |
| 2002/0118748 A1 * | 8/2002 | Inomata et al. | 375/240.04 |
| 2005/0053137 A1 * | 3/2005 | Holcomb | 375/240.16 |
| 2006/0098735 A1 * | 5/2006 | Chang | 375/240.12 |
| 2008/0285653 A1 * | 11/2008 | Chang | 375/240.16 |

* cited by examiner

*Primary Examiner* — Beemnet Dada
(74) *Attorney, Agent, or Firm* — Rabin & Berdo, P.C.

(57) ABSTRACT

A method for estimating the motion vector for a current macroblock within a current frame is provided by reference to a number of reference macroblocks within the previous frame. The method includes the following steps. First, an error between the current macroblock within a current frame and each of the reference macroblocks is determined according to a weighted sum of absolute differences (SAD) operation. The weighted SAD operation is to emphasize the absolute differences for high-frequency pixels within the current macroblock. Next, the reference macroblock having the lowest error may be determined as a matched macroblock. Finally, the motion vector for the current macroblock can be defined as the displacement between the macroblock and the matched macroblock.

4 Claims, 4 Drawing Sheets

MOTION ESTIMATION METHOD

BACKGROUND OF THE INVENTION

1. Field of the Invention

The invention relates in general to a motion estimation method, and more particularly to a motion estimation method employing a weighted SAD operation that is provided to emphasize absolute differences corresponding to high-frequency pixels within the current macroblock.

2. Description of the Related Art

Motion estimation is essential to video compression like MPEG and H.26x video compression. The motion vector for a current macroblock might be estimated using an SAD (sum of absolute difference) operation provided to equally accumulate pixel-by-pixel absolute differences between the current macroblock and each of the reference macroblocks in the previous frame.

The reference macroblock having the lowest SAD output could be determined as the matched macroblock, so that the displacement between the matched macroblock and the current macroblock can be defined as the motion vector for the current macroblock. However, the SAD operation used in the conventional motion estimation method equally accumulates the pixel-by-pixel absolute differences for both high-frequency and low-frequency pixels, which would tend to estimate the motion vector mistakenly due to luminance change and noise interference between different frames. Therefore, it is highly desired to provide a new motion estimation method, which could accurately determine the matched macroblock and thus the motion vector.

SUMMARY OF THE INVENTION

It is therefore an object of the invention to provide a more accurate motion estimation method. A current macroblock within a current frame is compared with a number of reference blocks within a previous frame according to a weighted absolute difference (SAD) operation. The weighted SAD operation is provided to emphasize absolute differences corresponding to high-frequency pixels within the current macroblock, such that improper motion estimation due to luminance change and noise interference between different frames may be improved.

The invention achieves the above-identified object by providing a method of estimating a motion vector for a current macroblock within a current frame by reference to a plurality of reference macroblocks within a previous frame. The method determines an error between the current macroblock and each of the reference macroblocks using a weighted SAD operation. The weighted SAD operation emphasizes absolute differences corresponding to high-frequency pixels within the current macroblock. Then, the method determines the reference macroblock having the lowest error as a matched macroblock for the current macroblock, and defines the motion vector for the current macroblock as the displacement between the current macroblock and the matched macroblock.

Other objects, features, and advantages of the invention will become apparent from the following detailed description of the preferred but non-limiting embodiments. The following description is made with reference to the accompanying drawings.

DETAILED DESCRIPTION OF THE INVENTION

The method of estimating a motion vector for a current macroblock within a current frame by reference to a number of reference macroblocks within a previous frame compares the current macroblock within the current frame with a number of reference blocks within the previous frame using a weighted sum of absolute difference (SAD) operation, and selects a matched macroblock for the current macroblock from the reference macroblocks according to the comparison, in order to obtain the corresponding motion vector. Since high-frequency pixels, such as edging pixels, within the current macroblock provide reliable features for motion estimation, emphasizing absolute differences corresponding to high-frequency pixels within the current macroblock will also lead to more reliable motion estimation.

Figure 1:
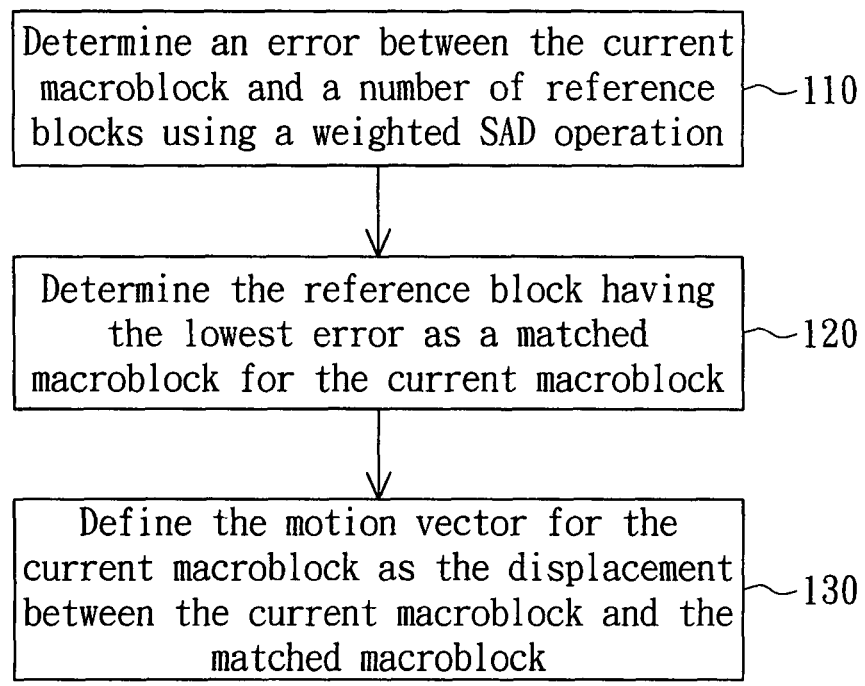
FIG. 1 is a flowchart showing a method of estimation a motion vector for a current macroblock according to an embodiment of the invention.
Figure 2A:
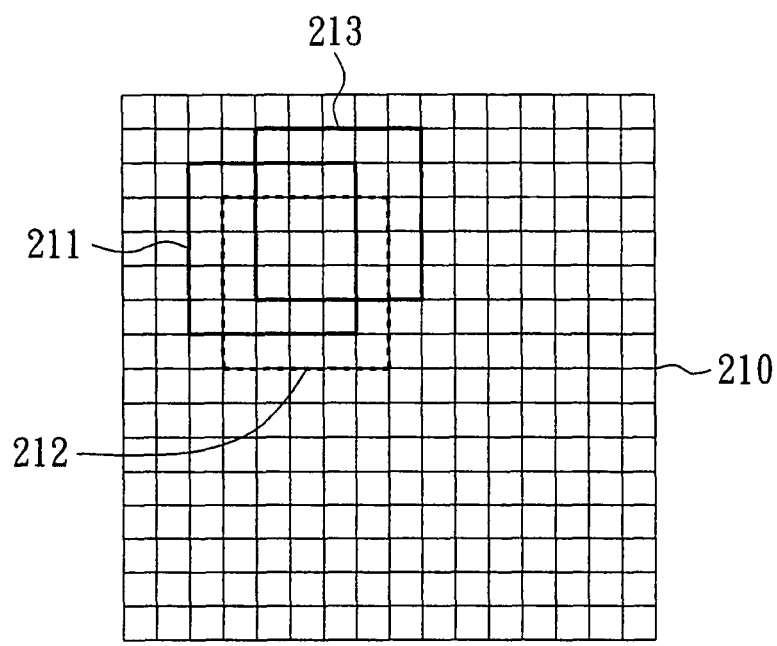
FIG. 2A is a diagram of comparing a current macroblock within a current frame with a number of reference macroblocks within a previous frame according to the method of FIG. 1.
Figure 2A:
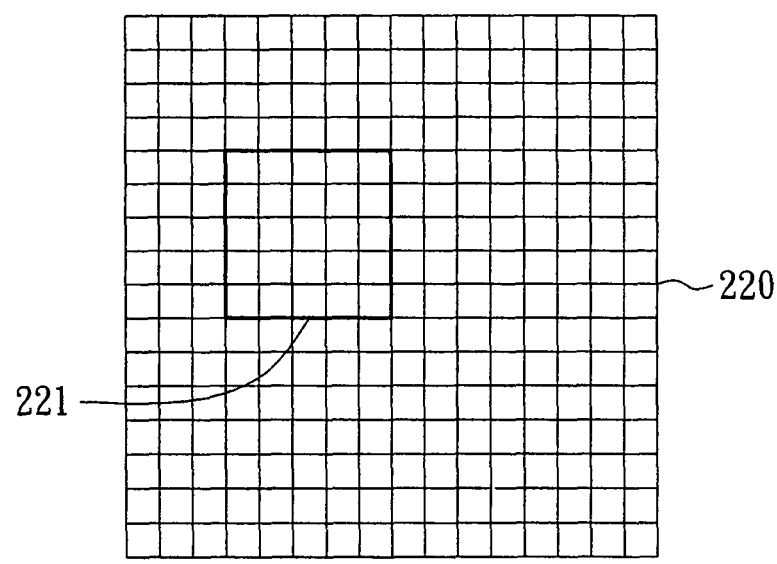

FIG. 1 is a flowchart showing a motion estimation method according to an embodiment of the invention. FIG. 2A is a diagram of comparing a current macroblock within a current frame with a number of reference macroblocks within a previous frame according to the method of FIG. 1. As shown in FIG. 2A, the invention is exemplified by comparing the current macroblock 221 within the current frame 220 with each of the reference macroblocks 211, 212, and 213 within the previous frame 210 to obtain a motion vector for the current macroblock 221 within the current frame 220.

In step 110, the current macroblock 221 is compared with each of the reference macroblocks, for example, three macroblocks 211, 212, 213 according to a weighted SAD operation to obtain the corresponding errors. The three errors e1, e2 and e3 corresponding to the reference macroblocks 211, 212, and 213 respectively are obtained according to the weighted SAD operation, and stand for the similarity between the current macroblock 221 and the reference macroblocks 211, 212, and 213. The weighted SAD operation emphasizes absolute differences corresponding to high-frequency pixels within the current macroblock 221.

In step 120, the reference macroblock having the lowest error, e.g. the reference macroblock 213, is selected from the reference macroblocks 211, 212, and 213 as a matched macroblock for the current macroblock 221 if the error, e.g. the error e3 of the reference macroblock 213, is the lowest among all the errors e1, e2 and e3.

In step 130, a motion vector for the current macroblock 221 may be defined as the displacement between the current macroblock 221 and the matched macroblock 213.

Figure 2B:
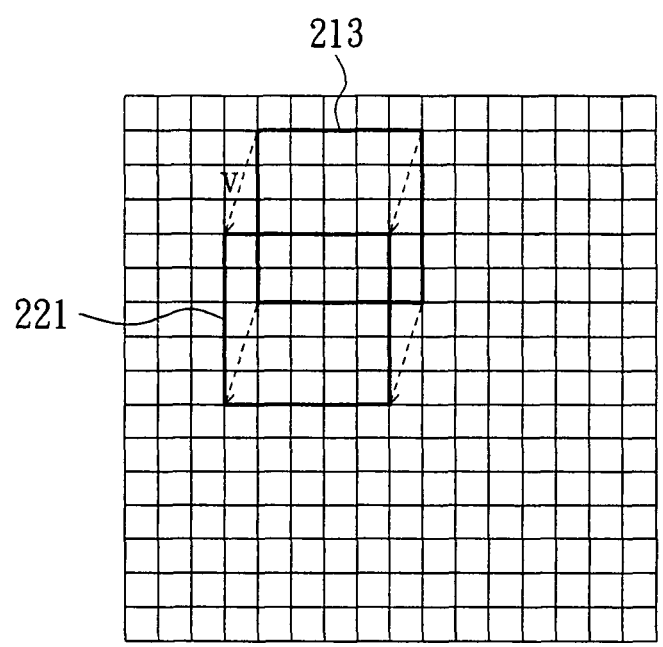
FIG. 2B is a diagram showing the motion vector for the current macroblock as the displacement between the current macroblock and the reference macroblock.

FIG. 2B is a diagram showing the motion vector v for the current macroblock 221 as the displacement between the current macroblock 221 and the reference macroblock 213. For example, if the reference macroblock 213 is determined as a matched macroblock for the current macroblock 221 in step 120, it implies that the reference macroblock 213, compared with the reference macroblocks 211 and 212, is most similar to the current macroblock 221. Accordingly, the motion vector v for the current macroblock 213 may be defined as the displacement from the reference macroblock 213 to the current macroblock 221.

Figures 3, 4:
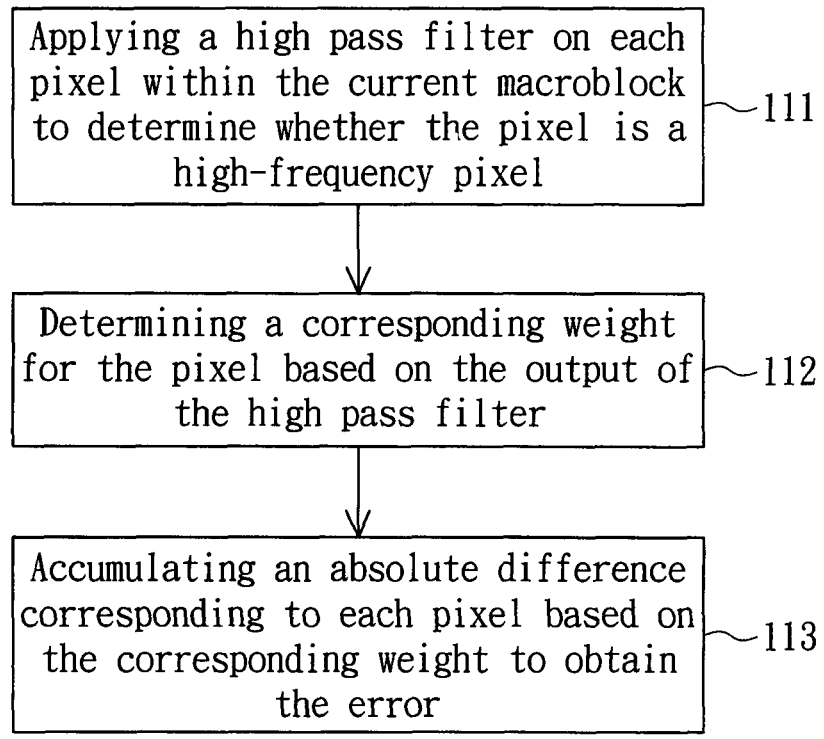
FIG. 3 is a flowchart showing step 110 of FIG. 1.
FIG. 4 is a high-pass filter used to determine high-frequency pixels in the current macroblock according to an embodiment of the invention.

FIG. 3 is a flowchart showing step 110 of FIG. 1. In step 111, a high-pass filter is applied to each pixel within the current macroblock 221. In the present embodiment of the invention, the application of the high-pass filter to each pixel is to accumulate the pixel and its neighboring pixels based on a mask 400, as shown in FIG. 4 but not limited thereto.

For example, as shown in FIG. 4, the mask 400 emphasizes the center and de-emphasizes the surrounding and is entrywise multiplied with a corresponding matrix of pixels comprising a pixel to be high-pass filtered and its neighboring pixels to determine whether or not the pixel is a high-frequency pixel based on the entrywise product. The entrywise product can be expressed as follows:

$$p(x) = |8Fc(x) - Fc(x_{n1}) - Fc(x_{n2}) - Fc(x_{n3}) - Fc(x_{n4}) - Fc(x_{n5}) - Fc(x_{n6}) - Fc(x_{n7}) - Fc(x_{n8})|$$    Formula 1 wherein $Fc(x)$ and $Fc(x_{n1})$~$Fc(x_{n8})$ denotes the pixel to be high-pass filtered within the current macroblock 221 and its eight neighboring pixels around the pixel.

Next, in step 112, the corresponding weight $w(x)$ of the weighted SAD operation, which is used to add weight to the pixel $Fc(x)$ to be filtered is determined according to the entrywise product. If the pixel $Fc(x)$ corresponds to a higher entrywise product $p(x)$, it implies that the pixel $Fc(x)$ is more likely to be a high-frequency pixel, such as an edging pixel, and thus the corresponding weight $w(x)$ is also higher. In the present embodiment of the invention, for example, the weight $w(x)$ may be determined with reference to a first threshold th1 and a second threshold th2, wherein the second threshold th2 is larger than the first threshold th1. If the entrywise product $p(x)$ is smaller than th1, this implies the pixel $Fc(x)$ is a low-frequency pixel, then the corresponding $w(x)$ may be set as 1, that is, no weight is added. If the entrywise product $p(x)$ ranges between the first threshold th1 and the second threshold th2, this implies the pixel $Fc(x)$ is a normally-high-frequency pixel, then the corresponding weight $w(x)$ is set as a first weight. If the entrywise product $p(x)$ is larger than the second threshold th2, this implies the pixel $Fc(x)$ is an extremely-high-frequency pixel, then the weight $w(x)$ is set as a second weight, wherein the second weight is larger than the first weight. In an embodiment of the invention, the first weight may be set as four and the second weight may be set as eight.

After all the weights for the weighted SAD operation, that are used to add weight to all pixels within the current macroblock, are obtained, in step 113, the current macroblock 221 is compared with each of the reference macroblocks 211, 212, and 213 according to the weighted SAD operation to obtain a corresponding error. The error may be expressed below:

$$e(Bc, v) = \sum_{x \in Bc} |Fc(x) - Fr(x - v)| \cdot w(x)$$    formula 2 wherein $e(Bc,v)$ is an error between the current macroblock 221 and a reference macroblock, wherein v is a displacement vector from the reference macroblock to current macroblock 221 and Bc denotes the current macroblock 221, $Fc(x)$ denotes each of the pixels $Fc(x)$ within the current macroblock 221, $Fr(x-v)$ denotes the corresponding pixel within the reference macroblock, and $w(x)$ denotes the weight for each of the pixels within the current macroblock 221.

With the weights, the error which is the weighted sum of absolute difference corresponding to all pixels within the current macroblock may also emphasize absolute differences corresponding to high-frequency pixels and better implies the similarity between the current macroblock and each of the reference macroblocks. The higher frequency the pixel $Fc(x)$ is, the larger the corresponding weight $w(x)$ is.

With the errors e1, e2 and e3 implying the similarity between the current macroblock 221 and the reference block 211, 212 and 213, as mentioned in Step 120 of FIG. 1, the reference macroblock having the minimum error may be determined as the matched macroblock for the current macroblock, and as mentioned in Step 130 of FIG. 1, the motion vector for the current macroblock may be defined as the displacement between the current macroblock and the matched macroblock.

While the invention has been described by way of example and in terms of a preferred embodiment, it is to be understood that the invention is not limited thereto. For example, in the weighted SAD operation, the thresholding may be designed differently. In addition, in the high-pass filter, the mask 400 may be designed to emphasize the pixels differently and to include different number of pixels. Moreover, the number of reference macroblocks may be also increased or decreased, depending on different designs. On the contrary, it is intended to cover various modifications and similar arrangements and procedures, and the scope of the appended claims therefore should be accorded the broadest interpretation so as to encompass all such modifications and similar arrangements and procedures.

What is claimed is:

1. A method of estimating a motion vector for a current macroblock within a current frame by reference to a plurality of reference blocks within a previous frame, comprising the steps of:

determining an error between the current macroblock and each of the reference blocks using a weighted SAD operation, the weighted SAD operation emphasizing absolute differences corresponding to high-frequency pixels within the current macroblock, including:
applying a high pass filter on each pixel within the current macroblock to determine whether or not the pixel is a high-frequency pixel,
determining a corresponding weight for the pixel based on the output of the high pass filter, and
accumulating absolute differences corresponding to all pixels within the current macroblock based on the corresponding weights in order to obtain the corresponding error;

determining the reference block having the lowest error as a matched macroblock for the current macroblock; and defining the motion vector for the current macroblock as the displacement between the current macrob lock and the matched macroblock.

2. The method according to claim 1, wherein in the step of determining the corresponding weight, the value of the corresponding weight is positive relative to the frequency of the pixel.

3. The method according to claim 1, wherein the high pass filter is expressed as a mask emphasizing the pixel to be high-pass filtered and deemphasizing the surrounding pixels.

4. The method according to claim 1, wherein the corresponding weight is set as 1, a first weight greater than 1 or a second weight, respectively, according to whether the frequency of the pixel is determined as low, normally high or extremely high, wherein the second weight is greater than the first weight.

* * * * *